United States Patent [19]

Lampert

[11] 4,320,513

[45] Mar. 16, 1982

[54] ELECTRIC CIRCUIT FOR THE PRODUCTION OF A NUMBER OF DIFFERENT CODES

[75] Inventor: Ernst Lampert, Unterpfaffenhofen, Fed. Rep. of Germany

[73] Assignee: Siemens Aktiengesellschaft, Berlin & Munich, Fed. Rep. of Germany

[21] Appl. No.: 252,933

[22] Filed: May 11, 1972

[30] Foreign Application Priority Data

May 17, 1971 [DE] Fed. Rep. of Germany ....... 2124320

[51] Int. Cl.$^3$ ................................................ G06F 7/58
[52] U.S. Cl. .......................................... 375/1; 331/78; 364/717
[58] Field of Search ............................ 178/22; 331/78; 235/152, 156; 325/65; 364/717

[56] References Cited

U.S. PATENT DOCUMENTS

| 3,439,279 | 4/1969 | Guanella | 331/78 |
| 3,515,805 | 6/1970 | Fracassi et al. | 178/22 |
| 3,521,185 | 7/1970 | Ley | 331/78 |
| 3,617,723 | 11/1971 | Melvin | 235/156 |
| 3,665,171 | 5/1972 | Morrow | |
| 3,700,806 | 10/1972 | Vasseur | 178/22 |
| 3,728,528 | 4/1973 | Kartchner | 178/22 |
| 3,751,648 | 8/1973 | Wu | 364/717 |
| 3,761,696 | 9/1973 | Russell | 331/78 |

Primary Examiner—Howard A. Birmiel
Attorney, Agent, or Firm—Hill, Van Santen, Steadman, Chiara & Simpson

[57] ABSTRACT

An electric circuit, in particular for devices and systems operating on an SSMA basis, for the production of a number of different codes according to a linear law of formation and having practically negligible values of cross correlation coefficients and autocorrelation coefficients during a shifting time and characterized by the provision of two basic code generators respectively consisting of a sequential network, at least one-half adder and at least one delay network, the half adder representing the output circuit, wherein one of the two codes is respectively given at both outputs of the half adder and the delay network is arranged in the connection path which extends between one of the two basic code generators and the half adder.

7 Claims, 7 Drawing Figures

ELECTRIC CIRCUIT FOR THE PRODUCTION OF A NUMBER OF DIFFERENT CODES

DESCRIPTION

This invention relates to an electric circuit for the production of a number of different codes according to a linear law of formation and having practically negligible values of their cross corelation coefficients on the one hand and, of their auto correction coefficients on the other hand, during a shifting over with respect to the time allotted to one station.

Circuits of the aforementioned type are utilized, in particular, with devices and systems which employ the so-called SSMA technique. The SSMA technique is a transmission technique with which the information itself is artificially spread in the frequency band and the given radio frequency range is utilized simultaneously by several stations for transmission purposes. The expression "SSMA" is derived from the term "Spread-Spectrum-Multiple-Access-Modulation". The SSMA method is primarily applied in connection with satellite transmission paths having multiple access. The SSMA technique is, for example, described in detail in the periodical "Proceedings of the IEEE", Vol. 54, 1966, pages 763–777. In utilizing the SSMA technique it is essential that a fairly large number of transmission stations operate in the same radio frequency range, and the signs which are transmitted by the individual stations have a respectively particular code modulation. This code modulation has two tasks, namely, to expand the individual signal to a larger frequency range on the one hand and to render the individual signs recognizable as a code signal for a certain individual station, on the other hand. Therefore, it is made possible, with respect to the individual receiver, to screen out a particular transmitting station from the frequency spectrum which is received, due to its code sign. The code sign of the individual station is thereby a relatively long sign, including for example 10 mega bits. The individual sign is most often expressed by means of a phase change of the transmitted high frequency oscillation, with respect to the respectively preceding bit. The information itself is additionally impressed onto the code sign in the transmission station, particularly while using rapid phase shift modulation, for example, in such a way that the code sign which includes relatively many bits is inverted in its phase with respect to essentially fewer bits when a sign change occurs in the information flow. The code signal is produced on the receiving side in a code generator which runs synchronously with the transmission side, and the code signal is submitted to a multiplication process with the received signal in the radio frequency or, which is usually the case, in the intermediate frequency position. Due to the multiplication process, the signal power during the reception of the code, which has not been changed by any additional information, will only appear in the form of a spectrum line. If the code signal is changed on the transmitting side by means of inverting individual rapid phase changes in the timing of the information which comprises only few bits, compared with the code signal, information will be obtained from the individual frequency component when the unchanged code signal is received, which information comprises all frequency components corresponding to the transmission-side information.

With the SSMA technique, code generators for the production of the code signals are required on both the transmitting and receiving sides. If the information network operating with SSMA consists of many stations, at least the same number of codes must be present as there are channels or stations within the network, for characterizing the individual channels or stations, respectively. In order to guarantee a perfect operation, it is required in this connection that the individual codes possess a good auto-correlation function, i.e. that the auto correlation coefficient is sufficiently small, $\leq 1\%$, for values of shifting over at least one station cycle. It is furthermore important for obtaining good channel separation with SSMA reception that the codes belonging to different channels be almost cross-correlation free. The cross-correlation coefficient, in other words, is also to be $\leq 1\%$. The maximum length linear sequences, which have been suggested as codes in the above literature passage, do not always fulfill the described requirements, and therefore represent a dangerous factor. In the periodical "IEEE Transactions on Information Theory", October 1967, pages 619–621, R. Gold has stated a law of formation for the production of large code families which, both with respect to their cross correlation coefficients and with respect to their auto correlation coefficients, fulfill the requirements to a sufficient degree which must be made for the application with an information network operating in accordance with SSMA techniques.

This invention is based on the task of providing a simple circuit principle for the production of large code families of the afore-mentioned kind, which is particularly helpful for the application of such code families in information networks operation in accordance with SSMA principles.

Starting from an electric circuit, in particular a circuit for devices and systems operating with SSMA, for the production of a number of different codes according to a linear law of formation, which has negligibly small values of its cross correlation coefficients, and of its auto correlation coefficients, during a shifting over at least one station time, the foregoing task is solved, according to the present invention, in such a way that two basic code generators are provided and respectively consist of a sequential network. At least one-half adder and at least one delay network are provided with the half adder representing the output circuit and having two inputs for receiving one of the two codes. The delay network is arranged in a connection between one of the two basic code generators and the half adder.

The present invention is based on the essential new recognition that code families of the type desired, especially for SSMA techniques, cannot only be produced with a single sequential feedback network, depending on a given setting of its different stages, but also with the help of two such sequential feedback networks whose codes are added depending on a mutually controllable phase shifting modulo-2.

The subject of the present invention offers the possibility of simultaneously producing a large number of codes belong to the same code family in a particularly simple manner merely through the utilization of two basic code generators. The realization of n outputs for n different codes, which is required for this purpose, merely provides for n half adders and n delay networks, and the n half adders are directly connected with one of their inputs to one of the two basic code generators, respectively, and with the other input, indirectly with the respectively other one of the two basic code generators, by way of the n delay networks.

In order to be able to carry out a desired code change, it is advantageous to provide the delay network as an adjustable or exchangeable device.

It is further advantageous to provide the delay network as a sequentially controllable network.

In a preferred aforementioned embodiment, the controllable sequential network comprises a chain connection of shift register stages with interposed half adders as well as gates via which the pulse succession of a basic code generator is supplied to the half adders and the input of the chain circuit, depending on the control signals provided at the control inputs of the gates. The shift register stages having a reset input for this purpose. With this preferred embodiment, the sum of the control signals provided at the control inputs of the gates advantageously represents a code address.

The possibility of deriving a large number of different codes, which is provided with the subject of the present invention, with the properties regarding their auto and cross correlation coefficients as described, from the delay network which can be adjusted or exchanged, respectively, with the help of a fixed given code pair, renders the subject of this invention particularly suited for application on the transmitting and receiving sides of several stations of an electric information network operating with SSMA, for addressing the individual stations or channels, respectively, in particular in such a manner that the basic code generator pair, which is present at all stations, synchronously produces the same code pair, and that the different station or channel addresses, respectively, are obtained by way of a corresponding adjustment of the delay networks.

Other objects, features and advantages of the invention, its organization, construction and operation, will be best understood from the following detailed description of embodiments of the invention taken in conjunction with the accompanying drawings, on which:

Figure 1:
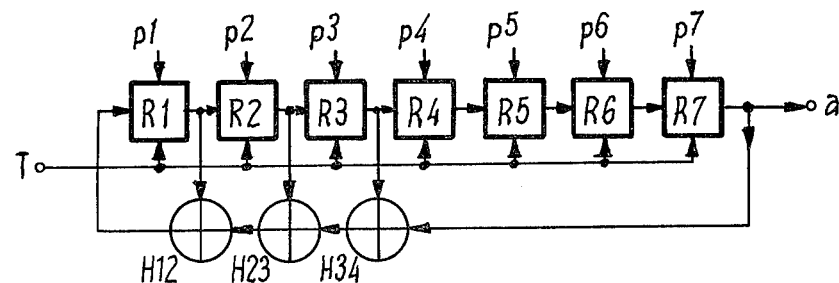
FIG. 1 is a schematic logic diagram of a prior art sequential feedback network for the production an individual code.
Figure 2:
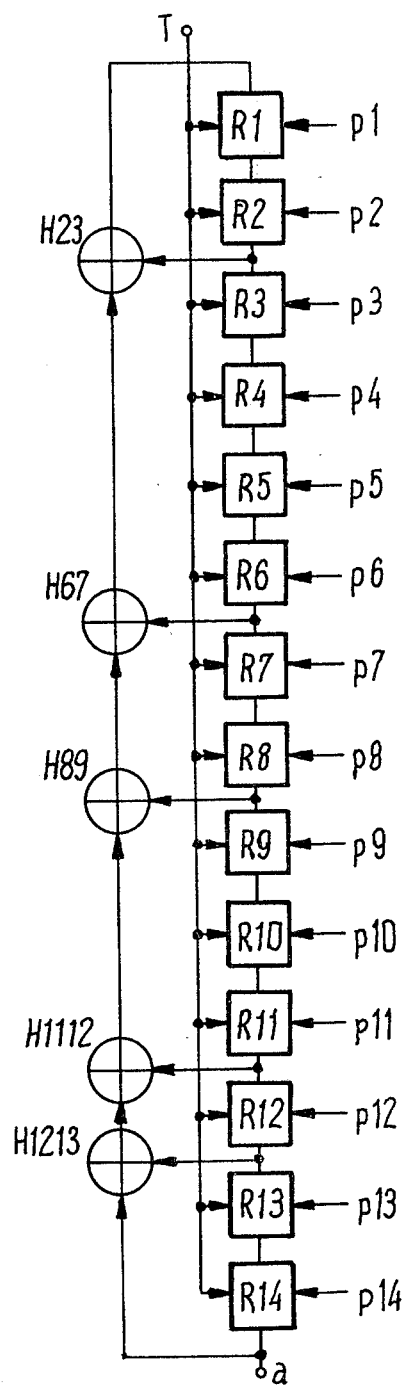
FIG. 2 is a schematic logic diagram of another prior art sequential feedback network for the production of a large number of codes.

In order to better understand the principles which were applied with the subject of this invention for producing codes with very large periods, the prior art arrangements for the production of codes as set forth in FIGS. 1 and 2 will be treated.

Linear shift-register codes can be described by means of a polynomial:

$$f(x) = \sum_{L=1}^{n} c_i x^i + 1 \qquad (I)$$

In the above polynomial, x is a variable and $C_i$ is a coefficient which is able to have only the values "0" and "1". Furthermore, the exponent n is identical with the number of stages of a shift register which is described by the code f(x) and which is constructed in accordance with feedback techniques. Such feedback coupled shift registers are well known from, among other places, the book S. W. Golomb, "Shift Register Sequences", Holden Day, Inc., San Francisco, 1967. If, for example, the polynomial $$fa(x) = x^7 + x^3 + x^2 + x + 1 \qquad (II)$$

is assigned to a code a, such a code can be produced in the feedback shift register illustrated in FIG. 1. The shift register comprises the seven shift register stages R1 through R7, which can be set by way of their control inputs p1 through p7. The shift register stages, which are interconnected as a chain can be, for example, "Master Slave Flip-Flops". All shift register stages R1 through R7 are supplied with a time base by way of their commonly connected timing inputs T. The output of the shift register stage R7 is fed back to the input of the first shift register stage R1, via the chain circuit of the half adder stages H 34, H 23, H 12. Furthermore, the common connection points of the shift register stages R1 and R2 are connected with the second input of the half adder H 12, the common connection point of the shift register stages R2 and R3 are connected with the second input of the half adder H 23, and the common connection point of the shift register stages R3 and R4 are connected with the second input of the half adder H 34. The output of the last shift register stage R7 is simultaneously the output a for the code produced with the help of this feedback shift register. However, the output can also be provided at any other desired location of the chain.

With each basic timing pulse arriving on the line T, the individual shift register stages will emit their content to the respectively next stage in the transmission direction. The contents of the last shift register stage R7, on one hand, is forwarded to the output a and, on the other hand, is applied to the input of the first shift register stage R1, via the feedback path consisting of the chain connection of the three half adders H 34, H 23 and H 12. Since fa(x) is a so-called primitive polynomial, it does not matter what the contents of the shift register was before the timing pulse is applied except from the "0" state of all seven shift register stage R1 through R7. Accordingly, it is also unimportant for the code occurring at the output a which initial state has been impressed onto the shift register by way of its control inputs p1 through p7. The same code will always be produced. Merely the phase position of the code, with respect to its initiation, is dependent upon the preadjustment of the shift register stages. As R. Gold proves in the aforementioned literature passage, a large number of codes which are favorable for networks operating in accordance with SSMA techniques can be be obtained in such a way that a second primitive polynomial fb(x) is obtained in addition to the polynomial fa(x). If α is a root of the polynomial fa(x) and β is a root of the desired polynomial fb(x), the desired polynomial fb(x) will result for the relation $$\beta = \alpha^{t+1} \text{ with} \qquad \text{(III)}$$

$$t = 2\frac{n+1}{2} \text{ for odd } n \text{ and with} \qquad \text{(IV)}$$

$$t = 2\frac{n+2}{2} \text{ for even } n \qquad \text{(V)}$$

With respect equation II, the following would, for example, result for the desired polynomial:

$$fb(x) = x^7 + x^5 + x^4 + x^3 + x^2 + 1 \qquad \text{(VI)}$$

If both polynomials are multiplied $$fa(x) \cdot fb(x) = fg(x) = x^{14} + x^{12} + x^{11} + x^8 + x^6 + x^2 + 1 \qquad \text{(VII)}$$

will result.

The polynomial fg(x) can be simulated with the help of a feedback shift register of the degree 2n, in particular with fourteen shift register stages.

A shift register consisting of fourteen chain-connected feedback shift register stages R1 through R14 has been illustrated in FIG. 2. The output of the last shift register stage R14, which again represents the output a for the produced code, feedback to the input of the first shift register stage R1 by way of the chain connection of the half adders H 1213, H 1112, H 89, H67 and H 23. In a manner analogous to the feedback shift register according to FIG. 1, the common connection point of the two register stages R2 and R3 is connected with a second input of the half adder H 23, the common connection point of the shift register stages R6 and R7 is connected with a second input of the half adder H 67, the common connection point of the shift register stages R8 and R9 is connected with a second input of the half adder H 89, the common connection point of the shift register stages R 11 and R 12 is connected with a second input of the half adder H 1112, and the common connection point of the shift register stages R 12 and R 13 is connected with the second input of the half adder H 1213. The shift register stages R1 through R14 have respective control inputs p1 through p14 by way of which they can be set. The feedback shift register according to FIG. 2, which represents a code generator, operates in principle like the feedback shift register as set forth in FIG. 1, but with the difference that the code produced therewith now depends on the preadjustment of the shift register stages. The adjustment of the shift register stages R1 through R14 in an increasing succession of binary representation, the setting 000 000 110 001 11 will supply another code than the setting 000 010 010 010 11. Both codes belong to the desired code family which is to be produced. In other words, different codes of one and the same family can be produced with the feedback shift register according to FIG. 2 when correspondingly different initial states are set. However, it must be taken into account that the different pre-settings may also lead to the same code. This renders the determination of the initial register states which are required for the production of certain different codes to an essential degree. An arbitrary selection, as is the desired result, is not possible.

The feedback shift register according to FIG. 2 also has the drawback that its use with an information network operating in accordance with SSMA techniques does not permit the maintaining of a possibly present phase synchronization with a code change. The initial pattern of the code is here determined by the initial state of the shift register stages, while the transfer time from one code to the other is usually desired to occur arbitrarily.

For the sake of completeness, it should be mentioned at this point that suitable code families may be stated for use with information networks operating in accordance with SSMA techniques, as such is shown in the literature by Ream, N: "Crosscorrelation of pairs of binary m-sequences of the same length", Battersea College of Technology, Dept. of Electrical Control Engineering, report, Jan. 28, 1966, wherein the relations states in equations III through V for detecting the second primitive polynomial fb(x) are not fulfilled.

Figure 3:
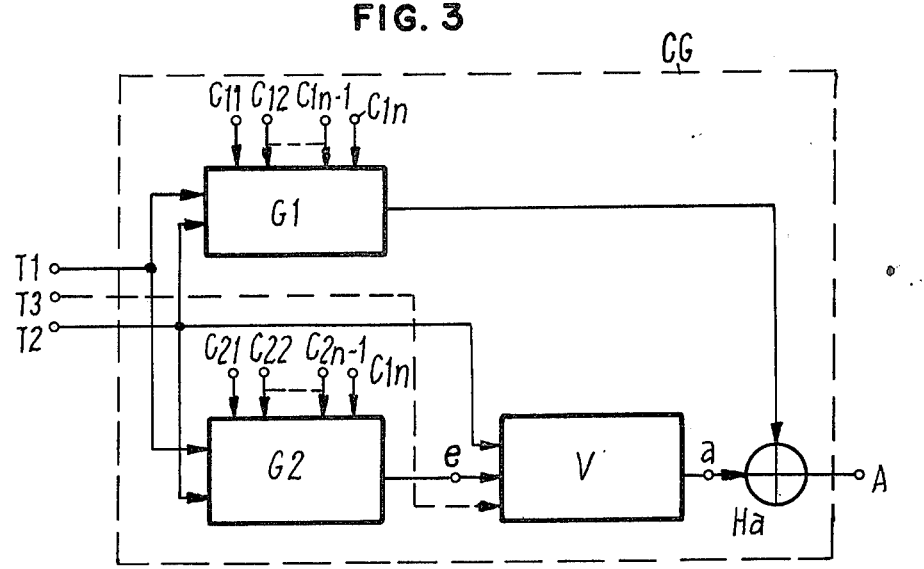
FIG. 3 is a schematic block diagram illustration of a sample embodiment of the present invention.

The code generator CG according to this invention, which is illustrated in FIG. 3, has two basic code generators G1 and G2, a delay network V which can be either adjustable or exchangeable, as well as half adder Ha. While the output of the basic code generator G1 is directly connected with one of the two inputs of the half adder Ha, the output of the basic code generator G2 is connected with the second input of the half adder Ha, via the delay network V. The input and the output of the delay network V are denoted by the reference characters e and a, respectively. The output a of the half adder Ha forms the output of the code generator CG. The basic code generators G1 and G2 realize a primitive polynomial, respectively, and are programmed by way of their control inputs C 11, C 12, ... C1n−1, C1n or C21, C 22 ... C 2n, respectively, in such a way that the code generated at the output a of the code generator CG corresponds to a generator polynomial as is stated, for example, in equation VII. The basic code generators G1 and G2 have two timing inputs, respectively. The timing input T1 serves for presetting and the timing input T2 for supplying the time base. The time base is also supplied to the delay network V which usually will consist of a sequential network. As FIG. 3 further reveals, a third timing input T3 is indicated as a broken line. In a controllable sequential delay network this timing input serves for presetting the network.

Figure 4:
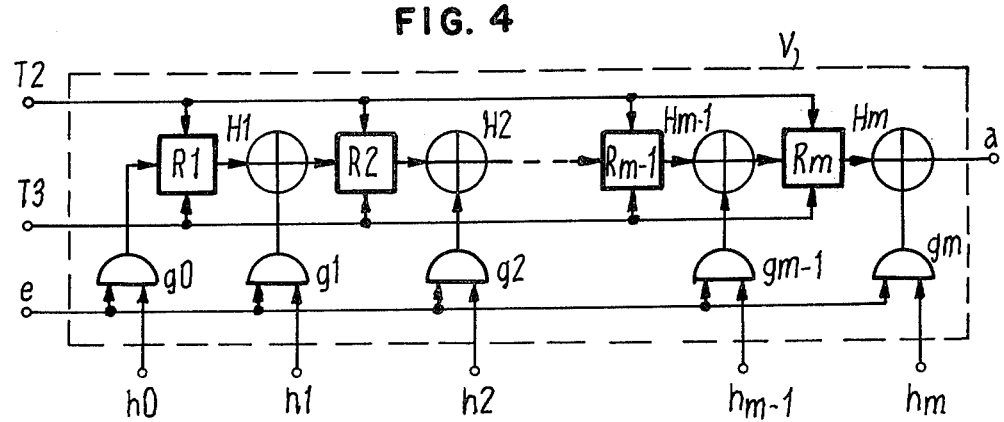
FIG. 4 is a schematic logic diagram of an adjustable delay network for use with the sample embodiment of FIG. 3.

FIG. 4 illustrates a preferred embodiment for a delay network V with the input e and the output a. The output pulse succession of the basic code generator with the delay network V connected at its load side is supplied to one of the inputs of the gates g0, g1, g2, ... gm−1, gm, respectively, by way of the input e. The other inputs of the gates are denoted by the reference characters h0, h1, h2, ... hm−1, hm. These inputs serve for supplying control signals which together represent a code address. These control signals, depending on their binary value, determine whether the respective gate is switched through or blocked. In addition to the gates, the delay network V comprises a plurality of shift register stages R1, R2, ... Rm−1, Rm as well as a plurality of half adders H1, H2, ... Hm−1, Hm which are interconnected as a chain in alternate succession between the shift register stages. For this purpose, an input to the shift register stage R1 effectively forms the input e, and the output of the half adder Hm provides the output a of the delay network. The input of the shift register stage R1 is directly connected with the output of the gate g0, while the remaining gates operate, respectively, toward a second input of the respective half adders H1, H2, .. . Hm−1, Hm, with their outputs. With a code address change, the possibility is provided that the gate g0 is blocked. In this case, care must be taken that the shift register stage R1 contains a "0" signal in order to prevent an undesired data inversion at the output of the semiconductor half adder H1. If both of the gates g0 and g1 are blocked by a newly-supplied code address, corresponding conditions are true for the shift register stage R2. In other words, if a certain number of successive gates of the delay network are blocked during an address change, proceeding from gate g0, without interspaces, then the shift register stage which follows the half adder with the mentioned gate assigned thereto in the transmission direction, must contain a "0" signal when the exclusive delay function which is desired from this network is to occur without interference. The timing input T3 is provided for this purpose, and it is by way of this input that a reset pulse is supplied to the shift register stages R1, R2, . . . Rm−1, Rm directly before a code address change so that all of the stages are set to the "0" condition.

Figure 5:
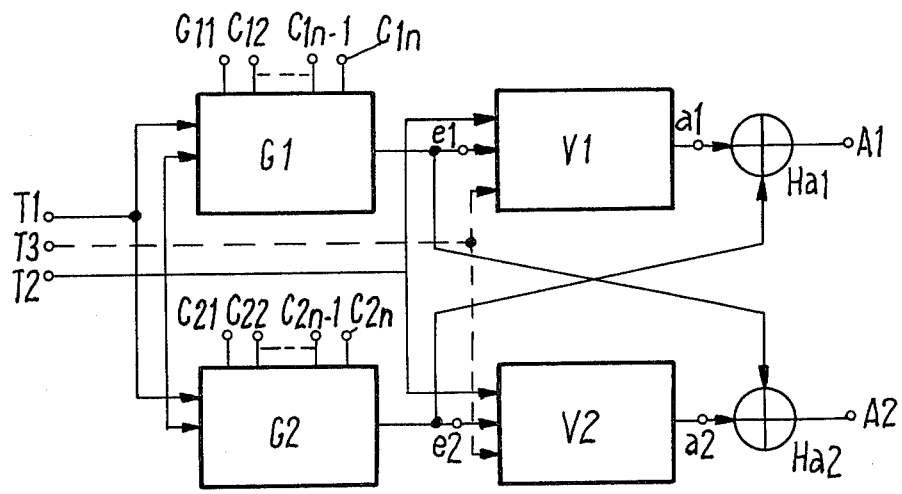
FIG. 5 is a schematic block diagram of another sample embodiment of the invention.

FIG. 5 illustrates a further embodiment of the present invention. In addition to the two basic code generators G1 and G2, the apparatus of FIG. 5 includes two adjustable and exchangeable delay networks V1 and V2 and two half adders Ha1 and Ha2. Aside from the delay network V1 and the half adder Ha1 with its output A1, the code generator is the same as that illustrated in FIG. 3. Thereby, the delay network V2, the half adder Ha2 and the output A2 according to FIG. 5 correspond to the delay network V, the half adder Ha and the output A of FIG. 3. By means of the delay network V1, which is connected in the connection path between the basic code generator G1 and one of the inputs of the half adder Ha1 whose second input is directly connected with the output of the basic code generator G2, a second output (A1) is realized which is of equal value as the output A2, i,e. different codes can be taken from each one of the two inputs A1 and A2, independently from each other, and belonging to the same desired code family and determined respectively by the setting or design of the delay networks V1 and V2. It should be pointed out in this connection that it is true that the code generator circuit associated with the output A1, on the one hand, and the code generator circuit associated with the output A2, on the other hand, are of equal value, but not identical. Both code generator circuits supply different codes with an equal adjustment or design, respectively, of the delay networks V1 and V2.

Figure 6:
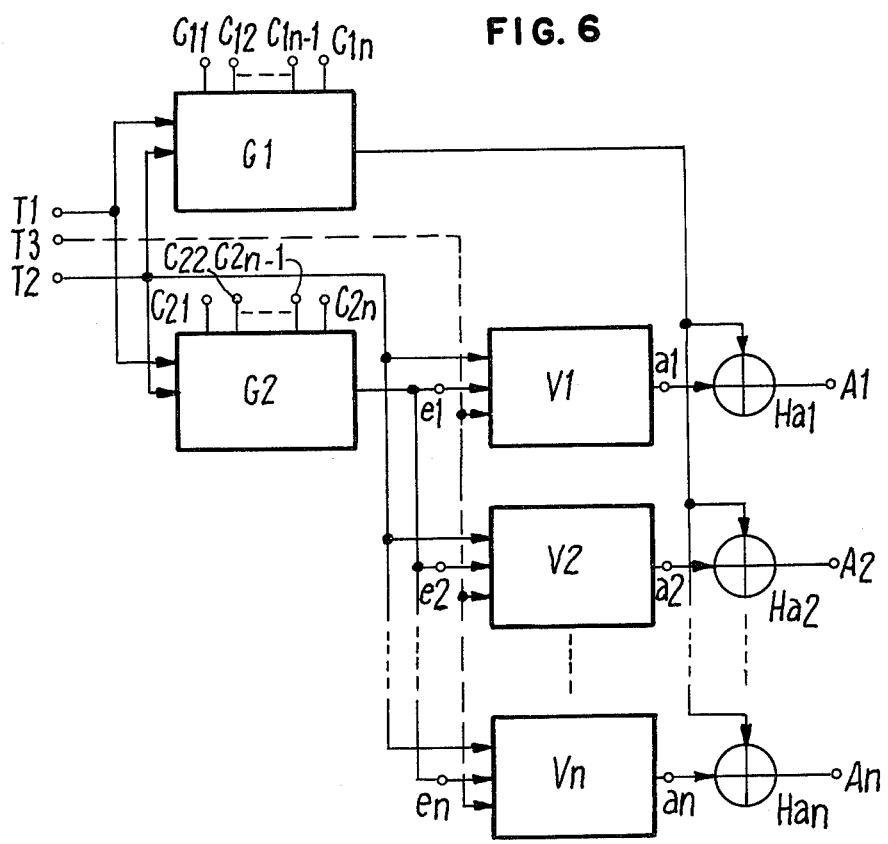
FIG. 6 is another schematic block diagram of another embodiment of the invention.

A general broadening of the code generator CG according to FIG. 3 for n outputs A1, A2, . . . An has been illustrated in FIG. 6. In FIG. 6 a portion of the circuit according to FIG. 3, the adjustable or exchangeable delay network V and the half adder Ha with its output A, is provided n times in parallel. In FIG. 6, the delay networks are denoted by V1, V2, . . . Vn having respective inputs e1, e2, . . . en and respective outputs a1, a2, . . . an, and the half adders are referenced with the characters Ha1, Ha2, . . . Han. The multiplication which has been shown in FIG. 6 can, of course, be varied in such a way that the parallel-connected arrangements of a delay network and a half adder are arranged on the side of the basic code generator G1 instead of on the side of the basic code generator G2, or that, corresponding to FIG. 5, both possibilities may be employed.

Figure 7:
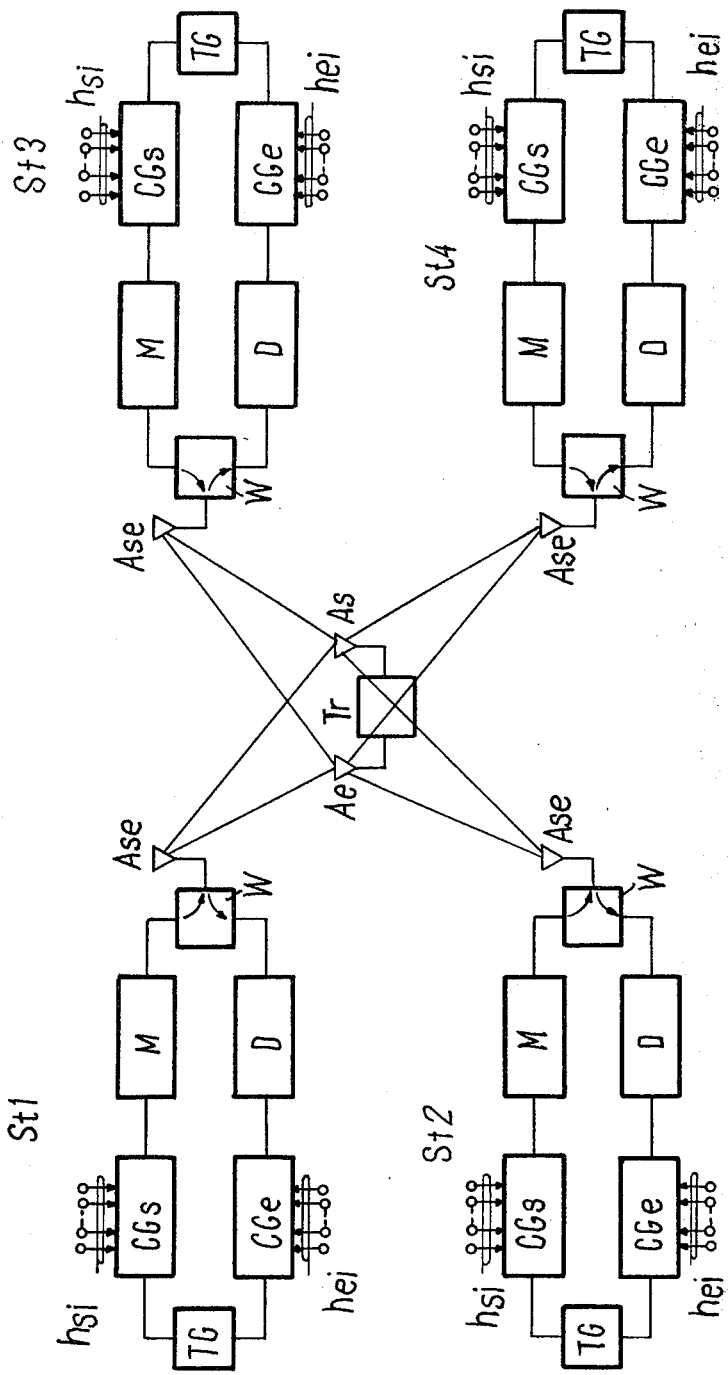
FIG. 7 is a block diagram illustration of the application of the present invention in an information network operating in accordance with SSMA techniques.

FIG. 7 schematically illustrates in block diagram form an information network comprising four stations St1, St2, St3 and St4, as well as a frequency-converting satellite transponder Tr, operating with signals modulated in accordance with the SSMA technique. Each of the four stations St1 through St4 has a highly constant time pulse generator TG and a transmission-reception switch W and a transmission-reception antenna Ase, shared equally between the transmitting and receiving sides. The timing-pulse generator TG produces the required control pulses for the code generators CGs and CGe which are provided on the transmitting and receiving sides of the station and which have inputs connected to the timing-pulse T1 and T2, and possibly T3, according to FIGS. 3–6. The transmission side code generator CGs operates to feed a modulator M connected to its output, which modulator M, in addition to the modulation device itself, has a power transmitting stage for the transmitted signals. The receiving side code generator CGe supplies the codes which are required for the demodulator D as required for demodulating the arriving signals. The demodulator D, in addition to a circuit for demodulating signals, includes a frequency converter with a subsequent amplifier at its input side. The frequency converting satellite transponder Tr receives the modulated signals which were transmitted by the transmission-reception antenna Ase, via its reception antenna Ae, and retransmits the signals to the transmission-reception antenna Ase of all stations after conversion and amplification, by way of its transmission antenna As. If, for example, the station St1 is to contact the station St2 in such an information network operating with SSMA technique, the transmission side code generator CGs of the station St1 must be synchronized with the reception side code receiver CGe of the station St2, which then generate equal codes. If no time agreements exist between the two stations with respect to the mutual code phase, the synchronization may take a very long time, since the codes employed here have a very large period, as is generally known, in the order of $10^6$ code elements. In order to avoid a long synchronization time each time a connection is to be established between two stations, it is useful to provide the aforementioned highly constant timing pulse generators so that only small code phase differences occur, even with fairly long interruptions, between successive voice connections between two stations; and therefore only a few $10^3$ code elements must be searched for obtaining synchronism. The application of the code generators, according to the invention, on the transmitting and receiving sides of all stations results in the possibility, in an extremely advantageous manner, to synchronize their basic code generators without taking into account the connection which is to be provided between the individual stations. When this synchronization is obtained, connections can be established between desired stations. For this purpose it is merely required, according to the agreements made within the information network, to generate the code which is associated with the desired connection by means of adjusting the delay network associated with each code generator. When a delay network is employed as is illustrated in FIG. 4, this can be effected in a simple manner by feeding the code address marking the desired code into the control signal inputs of the code generators which have been summarily denoted in FIG. 7 by the reference character hsi with respect to the transmitting code generator CGs, and by the reference character hei, with respect to the receiving side code generator CGe.

Although I have described my invention by reference to specific illustrative embodiments thereof, many changes and modifications of my invention may become apparent to those skilled in the art without departing from the spirit and scope of my invention. It is therefore to be understood that I intend to include within the patent warranted hereon all such changes and modifications as may reasonably and properly be included within the scope of my contribution to the art.

I claim:

1. An electric circuit, in particular for devices and systems operating in accordance with SSMA techniques, for the production of a number of different codes according to a linear law of formation, which codes have practically negligible values of cross correlation and also negligible values of auto correlation coefficients when regarding out of phase values of at least one code element, comprising a pair of basic code generators each of which includes a linear sequential network comprising and formed of interconnected half adders and shift register stages, an additional half adder and at least one delay network, said additional half adder connected to said delay network and forming an output circuit, one of said basic code generators connected to an input offset additional half adder and said delay network connected between the other of said basic code generators and another input of said additional half adder.

2. An electric circuit according to claim 1, comprising a number n of half adders and a number of delay networks for providing n outputs for n different codes, said n half adders directly connected to one of said basic code generators and connected indirectly with the other of said basic code generators respectively by way of the n delay networks.

3. An electric circuit according to claim 1 wherein said delay network is an adjustable delay network.

4. An electric circuit according to claim 1 wherein said delay network is a controllable sequential delay network.

5. An electric circuit according to claim 4 wherein said controllable sequential delay network comprises a plurality of chain connected shift register stages, and a plurality of half adders interposed between adjacent ones of said shift register stages, and a plurality of gates, one of said gates connected to the first shift register stage and the others of said gates connected to respective ones of said half adders, each of said gates having an input connected in common with like inputs of the others of said gates, and a control input for receiving control signals, said commonly connected inputs connected to one of said basic code generators for supplying the pulse succession of said one basic code generator to said half adders and to said chain connected shift register stages, depending on the control signals provided at said control inputs, and said shift register stages each having a reset input for receiving a reset signal.

6. An electric circuit according to claim 5, wherein the total number of control signals provided at said control inputs represent a code address.

7. An electric circuit according to claim 3 wherein said pair of basic code generators is a first pair of basic code generators, said additional half adder is a first additional half adder, said delay network is a first delay network, and comprising a plurality of other code generators each having respective pairs of basic code generators, a second additional half adder, and at least one additional delay network, and operating in respective transmitting side and receiving side of respective stations, wherein each pair of basic code generators for the transmitting side of a station and each pair of basic code generators for the receiving side of a station is operable to produce the same code pair synchronously, and wherein the addresses of said stations are obtained by corresponding adjustments of the respective delay networks.

* * * * *